(12) United States Patent
Onuma et al.

(10) Patent No.: US 6,425,428 B1
(45) Date of Patent: Jul. 30, 2002

(54) STEEL CORD HAVING FLAT SIDE SURFACE PORTION, METHOD OF MANUFACTURING SAME, AND PNEUMATIC TIRE REINFORCED WITH SAME

(75) Inventors: Shuichi Onuma; Naohiko Obana, both of Tokyo; Noboru Kusaba, Tochigi-ken, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/509,338

(22) PCT Filed: Sep. 25, 1997

(86) PCT No.: PCT/JP97/03408

§ 371 (c)(1),
(2), (4) Date: Mar. 24, 2000

(87) PCT Pub. No.: WO99/15727

PCT Pub. Date: Apr. 1, 1999

(51) Int. Cl.[7] .............................. B60C 9/00; B60C 9/18; B60C 9/20; D07B 1/06; D07B 1/08
(52) U.S. Cl. .......................... 152/527; 57/212; 57/311; 57/902; 152/451
(58) Field of Search ................................. 152/527, 451, 152/556; 57/212, 902, 311

(56) References Cited

FOREIGN PATENT DOCUMENTS

| EP | 0 551 124 A2 | * | 7/1993 | .................. 57/902 |
| JP | 8-226084 | * | 9/1996 | .................. 152/451 |
| JP | 9-119081 | * | 5/1997 | .................. 152/451 |

* cited by examiner

Primary Examiner—Adrienne C. Johnstone
(74) Attorney, Agent, or Firm—Sughrue Mion, PLLC

(57) ABSTRACT

Steel cord is manufactured by: forming a plurality of bends, per filament length equivalent to one twist pitch, on each of filaments which constitute an outer layer sheath, with the filament length equivalent to one twist pitch being a cycle; twisting these filaments while the bends belonging to the same phase are aligned in a cord axial direction; and subjecting cord side surfaces to compression processing. As a result, flat side surface portions are formed, in which a plurality of filaments forming the outer layer sheath are positioned substantially in the same plane. The steel cord thus formed is used in reinforcement plies for pneumatic radial tires such that the reinforcement plies are laminated in a manner in which the flat side surface portions are mutually parallel.

13 Claims, 10 Drawing Sheets

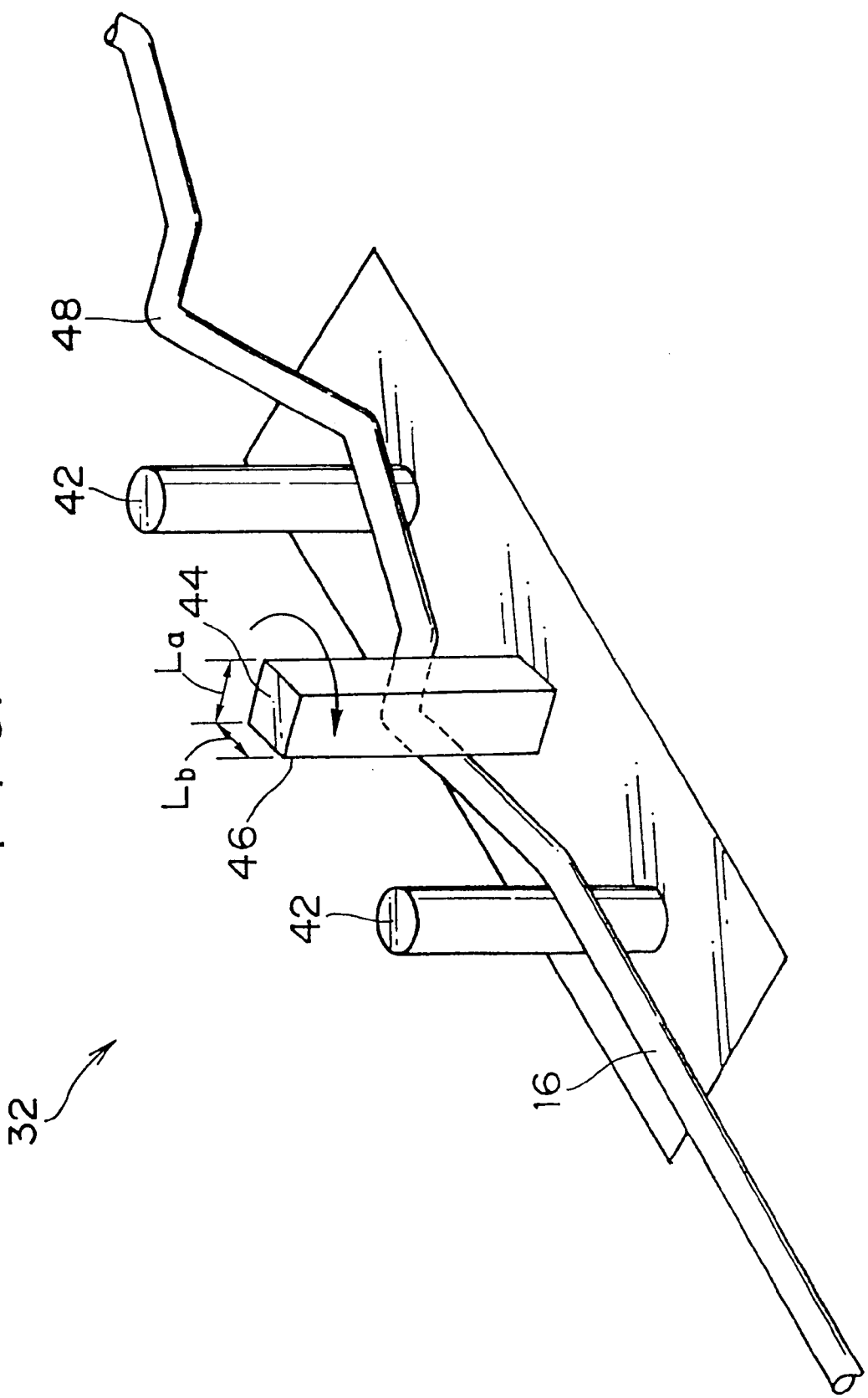

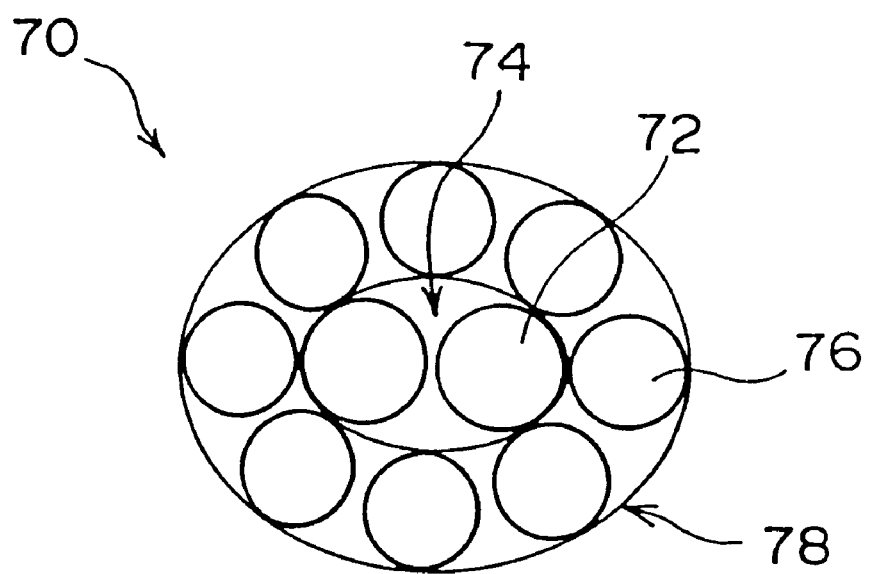
F I G. 1 2  PRIOR ART

STEEL CORD HAVING FLAT SIDE SURFACE PORTION, METHOD OF MANUFACTURING SAME, AND PNEUMATIC TIRE REINFORCED WITH SAME

FIELD OF THE INVENTION

The present invention relates to a steel cord used to reinforce rubber articles, and a method of manufacturing the steel cord, and particularly to a steel cord used as a reinforcing material for a belt layer in a pneumatic tire, and a method of manufacturing the steel cord.

Further, the present invention also relates to a pneumatic radial tire in which a steel cord is used as a reinforcing material for a belt layer.

BACKGROUND ART

As a reinforcing material of a pneumatic radial tire, conventionally, a steel cord formed by twisting a plurality of steel filaments subjected to brass plating has been widely used.

Regions in which the steel cords are used as reinforcing materials of a radial tire are principally a carcass and a belt layer between the carcass and a tread rubber. The belt layer usually includes two or more layers of reinforcement plies. Each of the reinforcement plies is comprised of a large number of steel cords arranged in a transverse direction of the tire and embedded in rubber. Further, steel cords for each reinforcement ply are disposed at a predetermined angle of inclination to the equatorial plane of the tire and respective steel cords of adjacent reinforcement plies are disposed so as to cross each other, that is, so that angles of inclination thereof are formed in opposite directions with respect to the equatorial plane of the tire.

Usually, the steel cord is manufactured by twisting steel filaments in a helical manner by using a buncher-type or tubular-type wire twisting machine. Accordingly, the most common shape of a cross section of the steel cord is substantially circular. On the other hand, in order to improve penetration of rubber, improve tensile rigidity, and reduce the thickness of a belt layer, and the like, a steel cord having a flat cross section has been proposed. For example, an example of a steel cord having a layer twisted structure is given below.

Japanese Patent Application Laid-Open (JP-A) No. 9-156314 discloses a steel cord having a substantially elliptical cross section, which comprises a core having two filaments disposed in parallel and a sheath formed by twisting five to eight filaments around and close to the core. Further, JP-A No. 9-158965 discloses a steel cord having an elliptical cross section or having an elliptical or a substantially circular cross section depending on portions in a longitudinal direction of the steel cord, which steel cord is comprised of a core having a plurality of filaments transversely arranged in parallel without being twisted, and a sheath formed by twisting a plurality of filaments around and in externally contact with the core. Moreover, JP-A No. 9-158066 discloses a steel cord having a 2+6 structure, comprising a core having two filaments twisted at a twist pitch of 30 mm or more, in which the ratio of a minor axis to a major axis in any cross section of the cord is in the range from 100% to 68.4%.

On the other hand, there has recently been demanded for reduction in weight of steel cord required for each tire in order to achieve lightening of a tire from the standpoint of resources/energy saving or environmental protection.

However, when a weight of steel cord used in a belt layer of a tire is reduced, tensile rigidity in a tire circumferential direction of a belt layer which is a composite body of steel cord and rubber deteriorates. Accordingly, an amount of deformation of the belt layer during rolling of tires increases and a tread is apt to be worn down. In addition, rolling resistance increases and fuel consumption cannot be reduced. Further, it is not possible to achieve improvement in controlling stability, which has been demanded in association with the advance of vehicle performance. In order to reduce the weight of steel cord with the tensile strength of the steel cord being maintained at a sufficient level, it is necessary to use filaments having high tensile strength. For this reason, there have also been used, as a filament, a high-strength steel wire in which tensile strength $T$ ($N/mm^2$) and filament diameter $d$ (mm) are set so as to satisfy the relation $T \geq 2250-1450 \log d$, and an ultra high-strength steel wire which satisfies the relation $T \geq 2750-1450 \log d$.

On the other hand, when a steel cord having a high strength per unit weight is used as a reinforcing material of a tire so as to only reduce the weight of the steel cord used, the above-described object cannot sufficiently be achieved.

Accordingly, in order that tensile rigidity of a belt layer which is a composite body of steel cord and rubber be improved, an angle of inclination of the steel cord in a belt layer, a distance between reinforcement plies, and the like have been designed in consideration of not only the tensile rigidity of steel cord, but also shear deformation resistance of rubber between steel cords. However, when a conventional layer twisted steel cord having a compressed cross section is used, the shear deformation resistance of rubber between steel cords cannot sufficiently be utilized. Therefore, it was difficult to obtain a belt layer whose weight is light and whose tensile rigidity is high.

In view of the above-described circumstances, it is a first object of the present invention to provide a steel cord in which tensile rigidity of the steel cord itself is high, and when the steel cord is used as a reinforcing material for a belt layer, shear deformation resistance of rubber between steel cords is effectively utilized, thereby allowing improvement in tensile rigidity of the belt layer per unit weight of steel cord used.

A second object of the present invention is to provide a method of manufacturing the steel cord adapted to achieve the first object of the present invention.

Further, a third object of the present invention is to provide a pneumatic radial tire in which the steel cord adapted to achieve the first aspect of the present invention is used as a reinforcing material for a belt layer, thereby allowing lightening of the tire, reduction in fuel consumption, and improvement in controlling stability.

DISCLOSURE OF THE INVENTION

In order to achieve the first object of the present invention, a steel cord comprising: a core; and an outer layer sheath including plural filaments, each filament having a diameter, all the diameters being substantially equal and said plural filaments being twisted around the core at substantially the same pitches, wherein said steel cord has a flat side surface portion on which at least two of said plural filaments forming the outer layer sheath are substantially arranged.

A conventional compressed layer twisted structure has a substantially elliptical cross section and has no flat side surface portion. On the other hand, the steel cord of the present invention has the above-described feature, and therefore, shear deformation resistance of rubber interposed between steel cords is effectively utilized. The reasons will be hereinafter explained.

Here, there is supposed a belt layer in which reinforcement plies formed by a large number of steel cords arranged in a transverse direction of a tire and embedded in rubber are laminated in a radial direction of the tire so that steel cords in adjacent reinforcement plies cross each other with rubber interposed therebetween. When a conventional steel cord having a substantially elliptical cross section is used as a reinforcing material, even if the steel cord is disposed so that the direction of a major axis thereof is placed parallel with a transverse direction of the reinforcement plies, respective bent side surfaces of adjacent steel cords in the direction in which the reinforcement plies are laminated face each other with rubber interposed therebetween. Accordingly, the thickness of rubber (hereinafter referred to as layer-to-layer rubber) interposed between the adjacent steel cords in the direction in which the reinforcement plies are laminated is not uniform. On the other hand, when the steel cord of the present invention is used as a reinforcing material and respective flat side surface portions of the adjacent steel cords in the direction in which the reinforcement plies are laminated are disposed so as to face each other with the layer-to-layer rubber interposed therebetween, the thickness of the layer-to-layer rubber interposed between the flat side surface portions becomes substantially uniform. Accordingly, when tensile force acts on a belt layer in which the steel cord of the present invention is used as a reinforcing material, the distribution of shear stress generated in the layer-to-layer rubber becomes more uniform. As a result, the layer-to-layer rubber can bear larger shear stress and a high tensile rigidity of an entire belt layer can be obtained. Further, concentration of shear stress generated in the layer-to-layer rubber is alleviated, and therefore, the durability of the belt layer also improves.

In order to allow uniform distribution of shear stress as described above, the width of the flat side surface portion is preferably large, and it is necessary that the flat side surface portion is one fourth or more, preferably a half or more of a cord width in a direction parallel with the flat side surface portion.

Further, it is effective that the flatness of the cord in the longitudinal direction thereof is high. Particularly, in side portions of the steel cord including the flat side surface portions facing each other with the layer-to-layer rubber interposed therebetween when the steel cord is used as a reinforcing material for the belt layer, the distance between adjacent filaments preferably does not exceed the diametrical dimension of the filament. More preferably, substantially no clearance is formed between adjacent filaments. To decrease the distance between the adjacent filaments in the flat side surface portion is effective also in improvement of tensile rigidity of the steel cord itself.

When a steel cord having a pair of flat side surface portions as periphery thereof facing parallel with each other with the core located therebetween is used for a belt layer in which a large number of reinforcement plies are laminated, the distribution of shear stress in the layer-to-layer rubber between adjacent reinforcement plies in a vertical direction can be made uniform.

Further, two pairs of flat side surface portions as periphery of the steel cord each facing parallel with each other with the core located therebetween can be provided. In this case, when the steel cord is used as a reinforcing material for a belt layer in such a manner that an angle formed by one of flat side surface portions belonging to the first pair and one of flat side surface portions belonging to the second pair becomes substantially a right angle, not only shear deformation resistance of the layer-to-layer rubber, but also shear deformation resistance of rubber between the adjacent steel cords provided in one reinforcement ply can also be utilized effectively.

In the steel cord of the present invention, the core preferably has a compressed cross section. The reason for this is that a clearance between the outer layer sheath for forming the flat side surface portions and the core can be made smaller, so as to allow improvement in rigidity of the cord itself and further facilitation of formation of the flat side surface portions. Particularly preferable is a steel cord which includes a core in which plural straight filaments are disposed parallel substantially on one plane and flat side surface portions substantially parallel to the one plane on which the filaments forming the core are disposed.

Further, in a steel cord in which a cord width a in a direction parallel to the plane on which the filaments for forming the core are disposed, and a cord width b in a direction perpendicular to the cord width a are given so as to satisfy the following expressions (1) and (2), the filaments or strands forming the outer layer sheath are twisted in close contact with the core. Accordingly, the tensile rigidity of the cord itself is high and the steel cord is particularly suitable to be used as a reinforcing material for a belt layer.

$$1.00 \leq a/(Xc+2 \times ds) \leq 1.03 \quad (1)$$

$$1.00 \leq b/(Yc+2 \times ds) \leq 1.03 \quad (2)$$

wherein, Xc is a large width of the core; Yc is a small width of the core; and ds is a diameter of each of the filaments forming the outer layer sheath.

Examples of the filaments forming the steel cord of the present invention include high strength steel wire whose tensile strength T (N/mm$^2$) and filament diameter d (mm) are set so as to satisfy the relation T≧2250−1450 logd, and ultra high strength steel wire formed to satisfy the relation T≧2750−1450 logd. According to the present invention, even when the weight of steel cord used for each tire is reduced by using high strength steel wire or ultra high strength steel wire, a belt layer having sufficient tensile rigidity can be formed.

In order to achieve the second object of the present invention, a method of manufacturing a steel cord of the present invention relates to a method of manufacturing the steel cord adapted to achieve the first object. In a conventional method of manufacturing a steel cord having a compressed cross section, a steel cord having a substantially circular cross section manufactured by using a buncher-type or tubular-type wire twisting machine is compressed by a roller or the like to be made flat. However, since a steel cord whose cross section is originally substantially circular is made flat by compressing, if compressive force is released, the cross section tends to return to its original shape due to elasticity. For this reason, it is difficult to reliably manufacture a steel cord having flat side surface portions, which is suitably used in the present invention.

Accordingly, the method of manufacturing a steel cord of the present invention is characterized in that it includes the step of forming, around a core, an outer layer sheath formed by twisting plural filaments having the substantially same diameters at the same pitches, and further comprises the following steps.

(1) A step in which prior to formation of the outer layer sheath, at least two bending portions are formed in each of filaments forming the outer layer sheath per filament length equivalent to one twist pitch, with the filament length equivalent to one twist pitch being a cycle. The object of the step is to ensure the formation of the flat side surface portions by previously forming the bending portion at each of the portions of the filaments which portions should be located at ends of the flat surface portions when the cord is in the completed state.

(2) A step in which filaments are collected and twisted together so that bending portions belonging to the same phase of the steel cord are arranged substantially in one row along a cord axial direction on a cord side surface. The object of the process is to obtain a cord having a shape which is similar to the desired shape when filaments forming the outer layer sheath are twisted around the core. This step can be carried out by, for example, making a cross section of a hole formed in a twisting die into the substantially same shape as the cross section of the desired cord.

(3) A step in which the cord side surfaces are compressed. An object of the step is to increase the flatness of the side surface serving as the flat side surface portion to thereby obtain a desired steel cord. This step is preferably carried out by compressing the cord side surfaces simultaneously from four sides perpendicular to the cord side surfaces.

In order to achieve the third object of the present invention, there is provided, as a pneumatic radial tire of the present invention, a radial tire comprising: a pair of bead portions; a carcass extending between said bead portions in a toroidal shape; and a belt layer comprised of at least two layers of reinforcement plies in which steel cords are embedded parallel on a crown portion of said carcass, wherein said steel cords are each the steel cord according to the above-described present invention, and respective flat side surface portions of steel cords of adjacent reinforcement plies are disposed to face parallel with each other.

BRIEF DESCRIPTION OF THE DRAWINGS

FIG. 7 is a perspective view of a bending portion forming device used in the method of manufacturing the steel cord according to the present invention.

FIG. 12 is a cross sectional view of a conventional steel cord used in a tire of a comparative example when seen from a cord axial direction.

BEST MODES FOR CARRYING OUT THE INVENTION

The present invention will hereinafter be described in detail with reference to the accompanying drawings.

Figure 1:
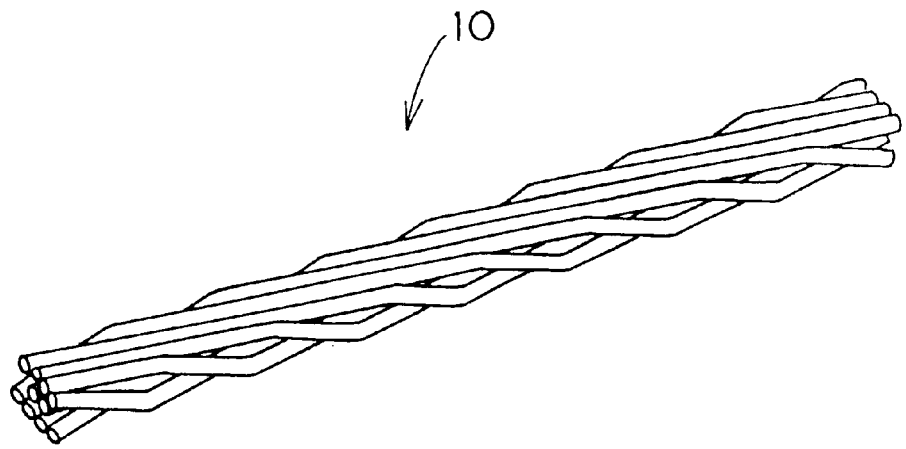
FIG. 1 is a perspective view of a steel cord according to the present invention.
Figure 2:
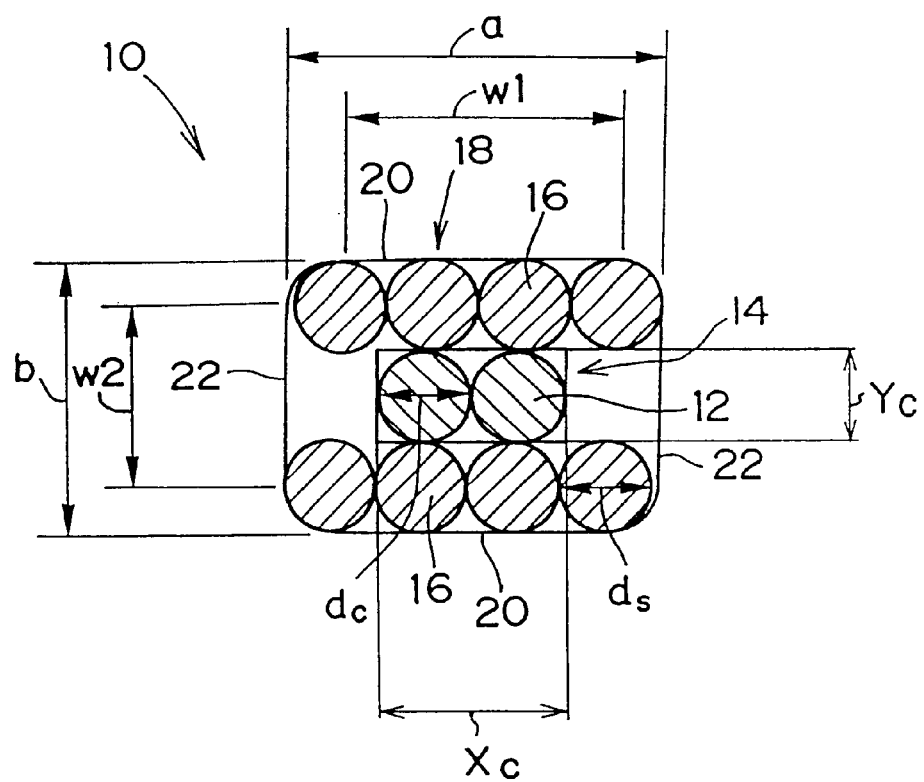
FIG. 2 is a cross sectional view of the steel cord according to the present invention when seen from a cord axial direction.
Figure 3:
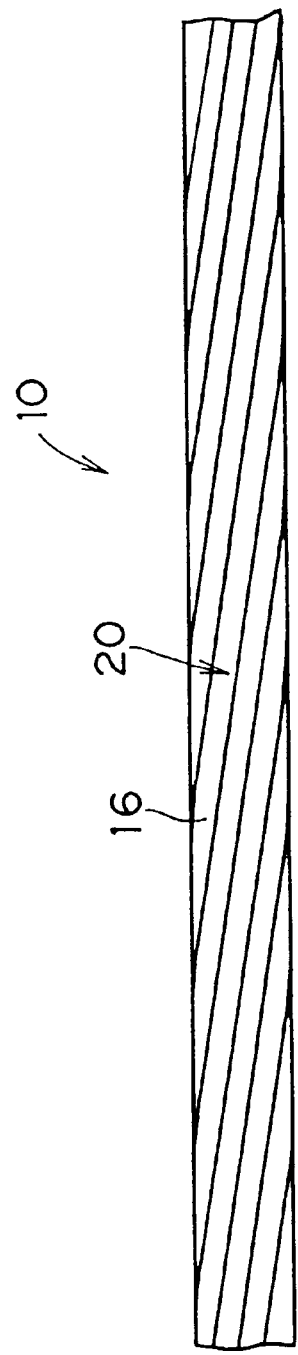
FIG. 3 is a side view of the steel cord according to the present invention when seen from a direction perpendicular to a first flat side surface portion.
Figure 4:
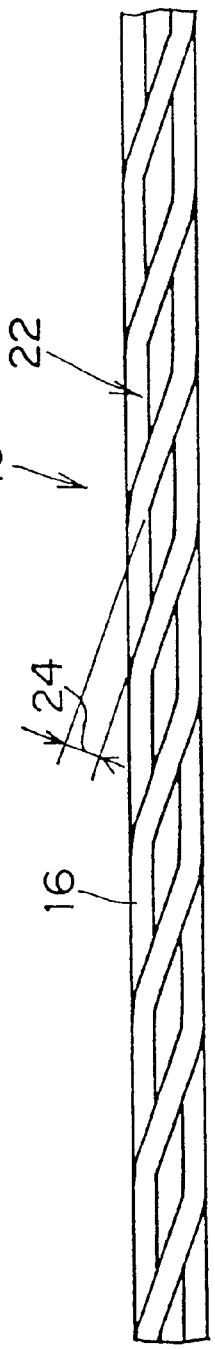
FIG. 4 is a side view of the steel cord according to the present invention when seen from a direction perpendicular to a second flat side surface portion.

FIGS. 1 to 4 are diagrams which each show an embodiment of a steel cord of the present invention. FIG. 1 is a perspective view, FIG. 2 is a cross sectional view when a cross section of the steel cord is seen from a cord axial direction, FIG. 3 is a side view when a side surface of the cord is seen from a direction perpendicular to a first flat side surface portion, and FIG. 4 is a side view when the side surface of the cord is seen from a direction perpendicular to a second flat side surface portion.

As shown in FIG. 2, a steel cord 10 is comprised of a core 14 in which two steel filaments 12 are disposed on the same plane parallel with each other in a cord axial direction, and an outer layer sheath 18 in which eight steel filaments 16 are twisted around the core 14 at a pitch of 16 mm.

The diameter and number of filaments which form the steel cord surely need be set so as to satisfy a required cord strength. Preferably, the steel cord of the present invention is, as will be described later, set in consideration of a desired shape. Further, in order to reduce the weight of a steel cord required for reinforcement of a belt layer, the steel filaments 12 and 16 preferably each have high tensile strength.

In the present embodiment, the steel filaments 12 which form the core 14 are each a brass-plated high carbon steel wire whose diameter dc is 0.32 mm and tensile strength is 3000 N/mm². Further, the steel filaments 16 which form the outer layer sheath 18 are each a brass-plated high carbon steel wire whose diameter ds is 0.30 mm and tensile strength is 3040 N/mm².

As shown in FIG. 2, flat side surface portions belonging to a first pair (hereinafter referred to as first flat side surface portions) 20 as periphery of the steel cord are each disposed parallel with a plane on which the steel filaments 12 for forming the core 14 are disposed. Further, the steel cord 10 has a substantially rectangular cross section. An angle formed by the first flat side surface portion 20 and a flat surface side surface portion belonging to a second pair (hereinafter referred to as a second flat side surface portion) 22 is a right angle.

As shown in FIG. 3, in the first flat side surface portion 20, the steel filaments 16 are disposed adjacently substantially in close contact with one another. On the other hand, as shown in FIG. 4, in the second flat side surface portion 22 as periphery of the steel cord, the steel filaments 16 are disposed parallel at a substantially fixed distance 24 between adjacent steel filaments.

As shown in FIG. 2, the steel filaments 16 which form the outer layer sheath 18 are twisted substantially in close contact with the core 14, and therefore, a cord width, a, at the first flat side surface portion 20 is substantially equal to Xc+2×ds, that is, about 1.24 mm, and a cord width, b, of the second flat side surface portion 22 is substantially equal to Yc+2×ds, that is, about 0.92 mm (wherein, Xc: a large width of the core=2×dc=0.64 mm, Yc: a small width of the core=dc=0.32 mm, ds: a diameter of each of the steel filaments 16 forming the outer layer sheath=0.30 mm, and dc: a diameter of each of the steel filaments 12 forming the core=0.32 mm).

In the steel cord of the present invention, the cord widths a and b of the steel cord 10 in which the steel filaments 16 forming the outer layer sheath 18 are twisted substantially in close contact with the core 14 in a manner similar to the steel cord 10 shown in FIG. 2 are each determined by the diameter dc of the steel filaments 12 for forming the core 14 and the diameter ds of the steel filaments 16 for forming the outer layer sheath 18. The ratio a/b is preferably in the range from 100% to 200% in consideration of productivity.

Respective widths w1 and w2 of the flat side surface portions 20 and 22 of the steel cord 10 shown in FIG. 2 are respectively about ¾ of the cord width, a, and about ⅔ of the cord width, b, and these values are each ½ or more of the corresponding cord width. Accordingly, when the steel cord 10 is embedded in a belt layer of a tire, the flat side surface portions 20 and 22 can sufficiently exhibit their functions, as will be described later.

FIGS. 5A to 5I are cross sectional views of steel cords according to other embodiments, each having a core of a suitable structure.

Figure 5A:
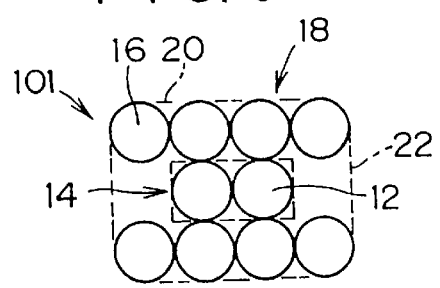
FIGS. 5A to 5I are cross sectional views which illustrate variations of the steel cord according to the present invention.

FIG. 5A shows a steel cord 101 comprised of the core 14 having two straight steel filaments 12 disposed parallel without being twisted and eight steel filaments 16 forming the outer layer sheath 18, and here two pairs of flat side surface portions 20 and 22 as periphery of the steel cord 101 are formed.

Figure 5B:
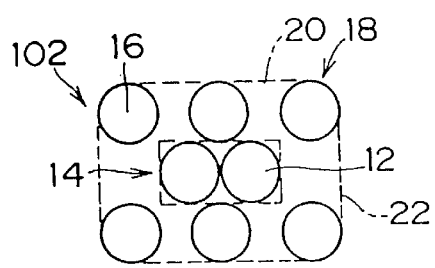

FIG. 5B shows a steel cord 102 comprised of the core 14 having two straight steel filaments 12 disposed parallel without being twisted and six steel filaments 16 forming the outer layer sheath 18, and here two pairs of flat side surface portions 20 and 22 are formed.

Figure 5C:
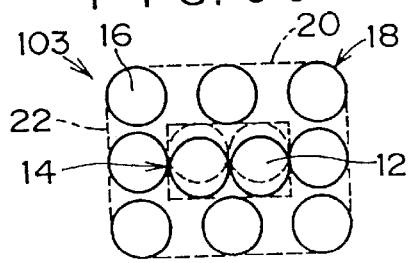

FIG. 5C shows a steel cord 103 comprised of the core 14 having two corrugated steel filaments 12 arranged, without being twisted, in a direction perpendicular to that of amplitude of the corrugation and eight steel filaments 16 forming the outer layer sheath 18, and here two pairs of flat side surface portions 20 and 22 are formed.

Figure 5D:
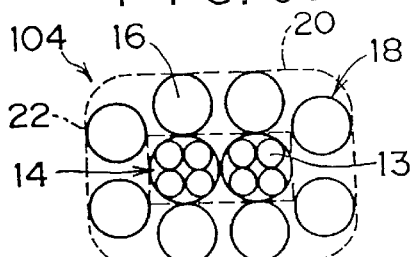

FIG. 5D shows a steel cord 104 comprised of the core 14 having two filaments 13 disposed parallel with each other without twisting, which filaments are each formed by twisting four steel wires, and eight steel filaments 16 forming the outer layer sheath 18, and here two pairs of flat side surface portions 20 and 22 are formed.

Figure 5E:
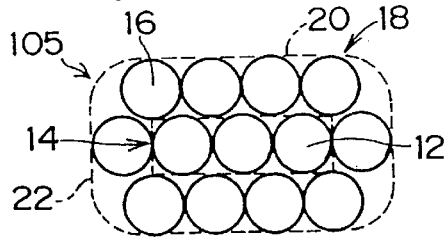

FIG. 5E shows a steel cord 105 comprised of the core 14 having three straight steel filaments 12 disposed parallel on one plane without being twisted and ten steel filaments 16 forming the outer layer sheath 18, and two pairs of flat side surface portions 20 and 22 are formed.

Figure 5F:
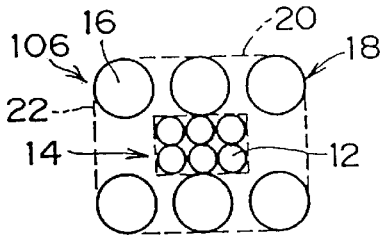

FIG. 5F shows a steel cord 106 comprised of the core 14 having six straight steel filaments 12 of a two-layered structure in which two layers each having three filaments on one plane are disposed parallel, and six steel filaments 16 forming the outer layer sheath 18. Two pairs of flat side surface portions 20 and 22 are formed in the steel cord.

Figure 5G:
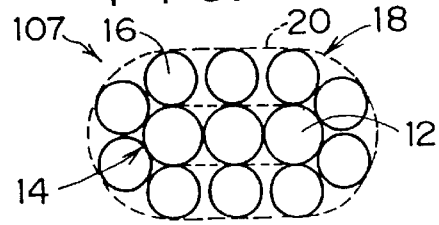

FIG. 5G shows a steel cord 107 comprised of the core 14 having three straight steel filaments 12 disposed parallel on one plane without being twisted and ten steel filaments 16 forming the outer layer sheath 18, and here one pair of flat side surface portions 20 is formed.

Figure 5H:
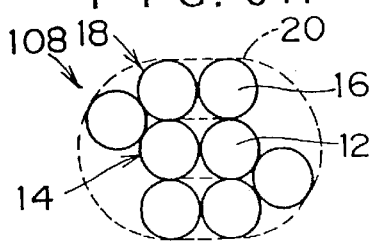

FIG. 5H shows a steel cord 108 comprised of the core 14 having two straight steel filaments 12 disposed parallel on one plane without being twisted and six steel filaments 16 forming the outer layer sheath 18, and here one pair of flat side surface portions 20 is formed.

Figure 5I:
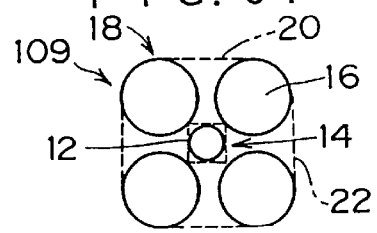

FIG. 5I shows a steel cord 109 comprised of the core 14 formed by one straight steel filament 12, and four steel filaments 16 forming the outer layer sheath 18, and here two pairs of flat side surface portions 20 and 22 are formed.

Among the steel cords of the present invention shown in FIGS. 5A to 5I, particularly preferable is a steel cord in which a core having plural straight steel filaments which are disposed parallel substantially on one plane is used and flat side surface portions disposed substantially parallel with the one plane on which the steel filaments forming the core are located. Further, in a case in which the core having plural filaments disposed parallel without being twisted is used as shown in FIG. 5D, these filaments are twisted at the same twist pitch and are disposed closely in such a manner that directions in which adjacent filaments are twisted become opposite. In this structure, a high tensile rigidity can be obtained, which is preferable.

Next, a suitable method of manufacturing the steel cord of the present embodiment will be described with reference to FIGS. 6 to 9.

Figure 6:
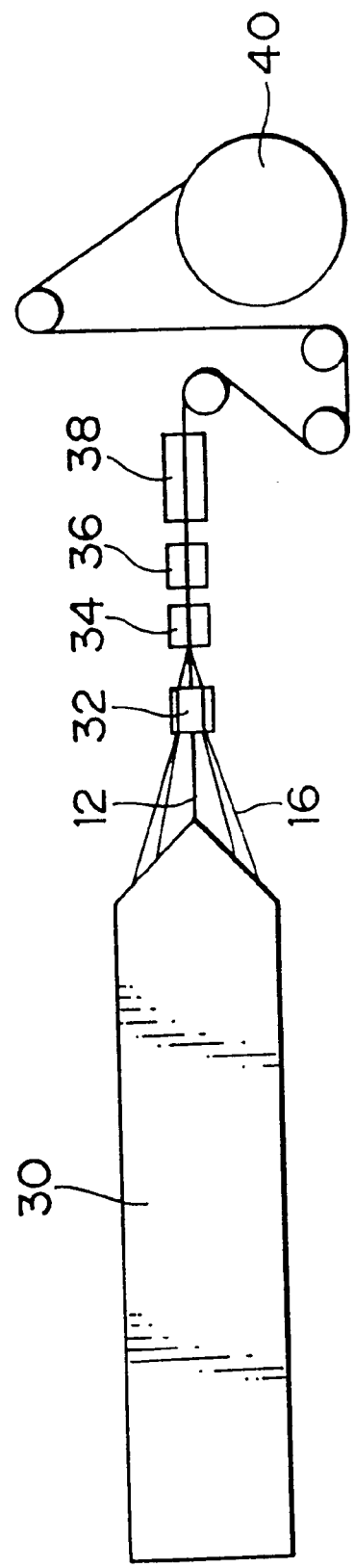
FIG. 6 is a schematic diagram which illustrates a method of manufacturing the steel cord according to the present invention.

FIG. 6 is a schematic diagram of a device used for manufacturing the steel cord. Two steel filaments 12 for forming the core 14 are each pulled out from a bobbin (not shown) disposed in a barrel 30 of a tubular-type wire twisting machine and guided outside the barrel 30 without passing through a guide on a side surface of the barrel 30 so as not to be twisted together. On the other hand, eight steel filaments 16 for forming the outer layer sheath 18 are each similarly pulled out from a bobbin (not shown) disposed in the barrel 30, but guided outside the barrel 30 via the guide on the side surface of the barrel 30. Bending portions are formed in the eight steel filaments forming the outer layer sheath 18 at predetermined intervals by using a bending portion forming device 32 prior to twisting of the filaments by using a twisting die 34. The steel cords twisted by the twisting die 34 are shaped in a compressing device 36 and subjected to repeated bending processing in a roller group 38, and thereafter, wound into a take-up reel 40.

Formation of bending portions in this process can be carried out by using, for example, the bending portion forming device 32 shown in FIG. 7. The bending portion forming device 32 includes, on one side surface thereof, two fixed pins 42 and a rotating pin 44 disposed between the pins. The steel filament 16 in which a bending portion is to be formed is caused to sequently pass though the fixed pin 42, the rotating pin 44, and the fixed pin 42 in that order while contacting respective side surface of these pins.

Figure 8A:
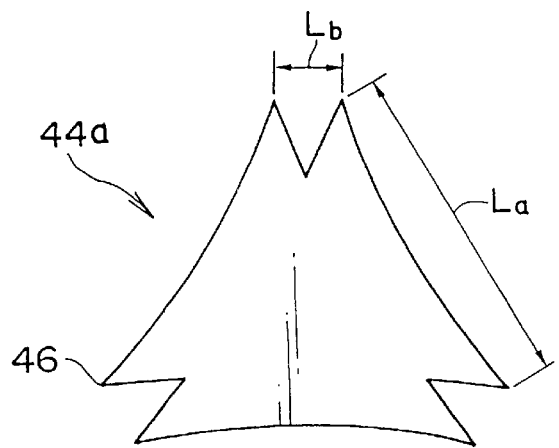
FIGS. 8A to 8C are plan views which show variations of a rotating pin in the bending portion forming device shown in FIG. 7.
Figure 8B:
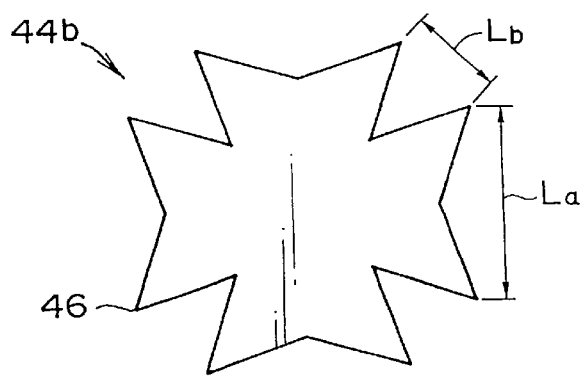
Figure 8C:
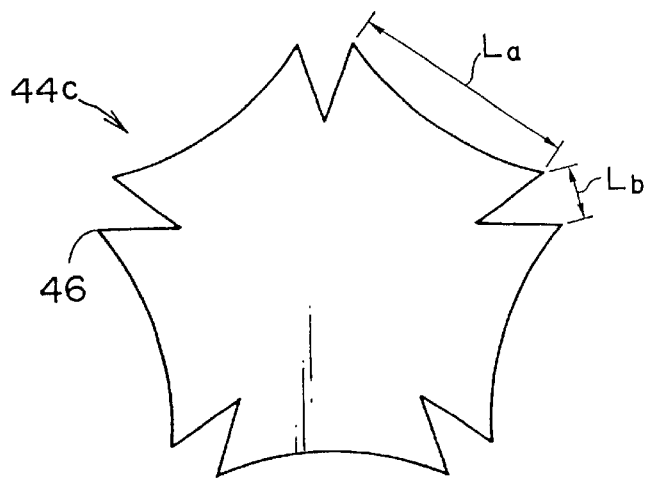
Figure 9:
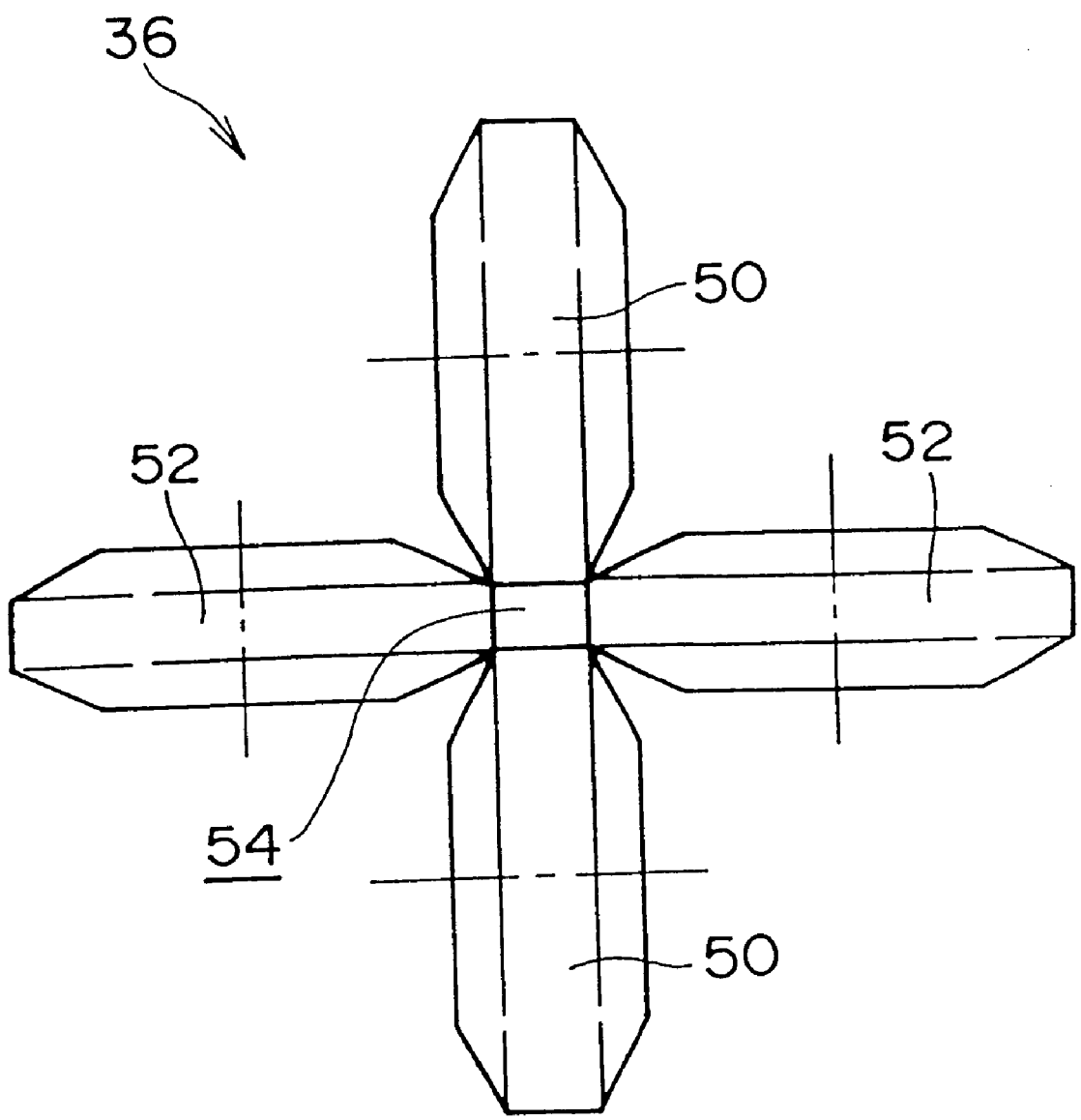
FIG. 9 is a plan view which shows a compressing device used in the method of manufacturing the steel cord according to the present invention.

The rotating pin 44 is a pillar-shaped body having convex portions 46 at predetermined interval on the side surface thereof. The rotating pin 44 rotates together with the passing of the steel filament 16, and a bending portion 48 is formed in the steel filament 16 by the convex portion 46. The rotating pin 44 shown in FIG. 7 is formed as a pillar-shaped body having a rectangular bottom surface. A ridge line of the pin corresponds to the convex portion 46, and a longer side dimension, La, and a shorter side dimension, Lb, of the bottom surface correspond to an interval of the bending portion 48. FIGS. 8A to 8C show other rotating pins 44a, 44b, and 44c of suitable shape. In manufacturing the steel cord of the present embodiment, in order to obtain a predetermined interval of the bending portion, La is set to be about 6.3 mm and Lb is set to be about 1.9 mm. The relation between a rotating speed of the twisting machine and a speed at which the steel filament passes through the twisting machine is set so that the bending portion 48 is formed at four places in the steel filament per one twist pitch.

The shape of a hole of the twisting die 34 when seen from a direction in which the cord proceeds is made substantially the same as the shape of a cross section of an intended steel cord. In this case, a longer side of the die is 1.24 mm and a shorter side of the die is 0.92 mm. As a result, when the steel filaments pass through the hole of the twisting die 34, they are twisted in such a manner that the bending portions 48 of the steel filament 16 are located sequentially at four corners of the hole of the twisting die 34. Therefore, a cord of substantially intended shape can be obtained.

The compressing device 36 includes processing rollers 50 facing in a vertical direction and processing rollers 52 facing in a transverse direction. Further, respective rotating shafts of the four processing rollers are positioned on the same plane perpendicular to a direction in which the cord proceeds, and a processing portion 54 which compresses the cord simultaneously from the upper, lower, left, and right sides is formed. The dimensions of the processing portion 54 in vertical and transverse directions are respectively about 0.90 mm and 1.22 mm, which are slightly smaller than the hole of the die 34. The shaping of the cord in this process does not necessarily need to be effected in one compressing operation, and an intended shape of the cord may be realized by compressing operations performed several times. Further, it is preferable that cord internal stress which causes twisting, bending, or the like be alleviated by repeatedly conducting bending processing after the compressing operation.

Figure 10:
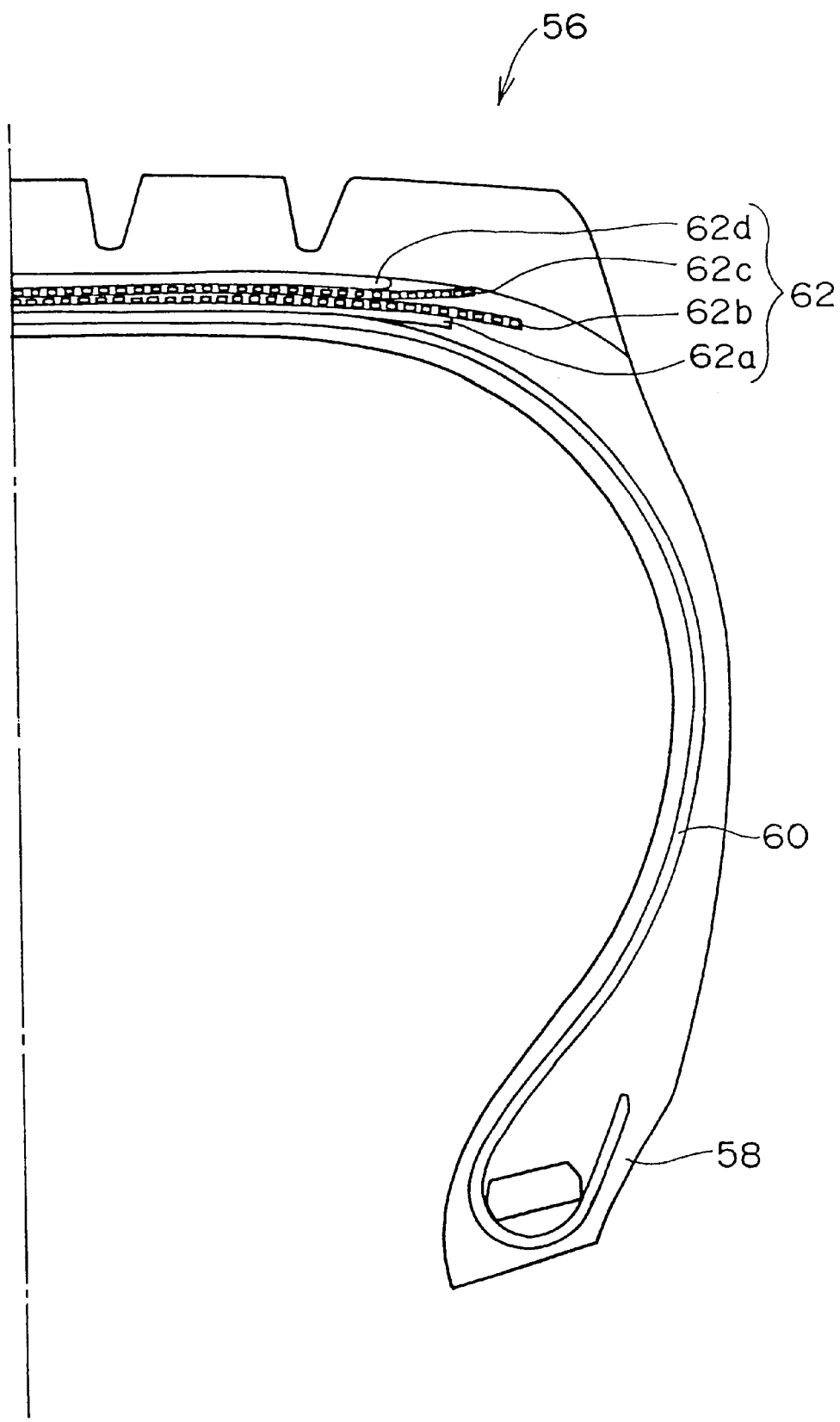
FIG. 10 is a cross sectional view of a pneumatic radial tire according to the present invention.

FIG. 10 is a cross sectional view which shows a suitable example of a pneumatic radial tire according to the present embodiment.

A tire 56 includes a pair of bead portions 58, a carcass 60 extending between the bead portions 58 in a toroidal shape, and a belt layer 62 comprised of four layers of reinforcement plies 62a to 62d on a crown portion of the carcass. Among the reinforcement plies 62a to 62d which form the belt layer 62, the reinforcement plies 62a to 62c each include the steel cords 10 shown in FIG. 1 arranged and embedded parallel with each other therein. These steel cords are disposed so that the first flat side surface portions 20 thereof are made parallel to a direction in which the cords are arranged. An amount of the steel cord 10 used for each of the reinforcement plies and an angle of inclination with respect to a tire equatorial plane are not particularly specified in the present invention. In the present embodiment, tires each having the size of 11R22.5 were prepared and 23 steel cords were used per 5 cm in the widthwise dimension of each of the reinforcement plies 62a to 62d. Further, the angle of inclination of the steel cord with respect to the tire equatorial plane in the reinforcement ply 62a was +45 degrees, the corresponding angle of inclination in the reinforcement ply 62b was +20 degrees, and the corresponding angle of inclination in the reinforcement ply 62c was −20 degrees. A distance, w4, between the steel cords in each reinforcement ply was about 0.93 mm and a distance, w3, between steel cords of adjacent reinforcement plies was about 0.9 mm.

Figure 11:
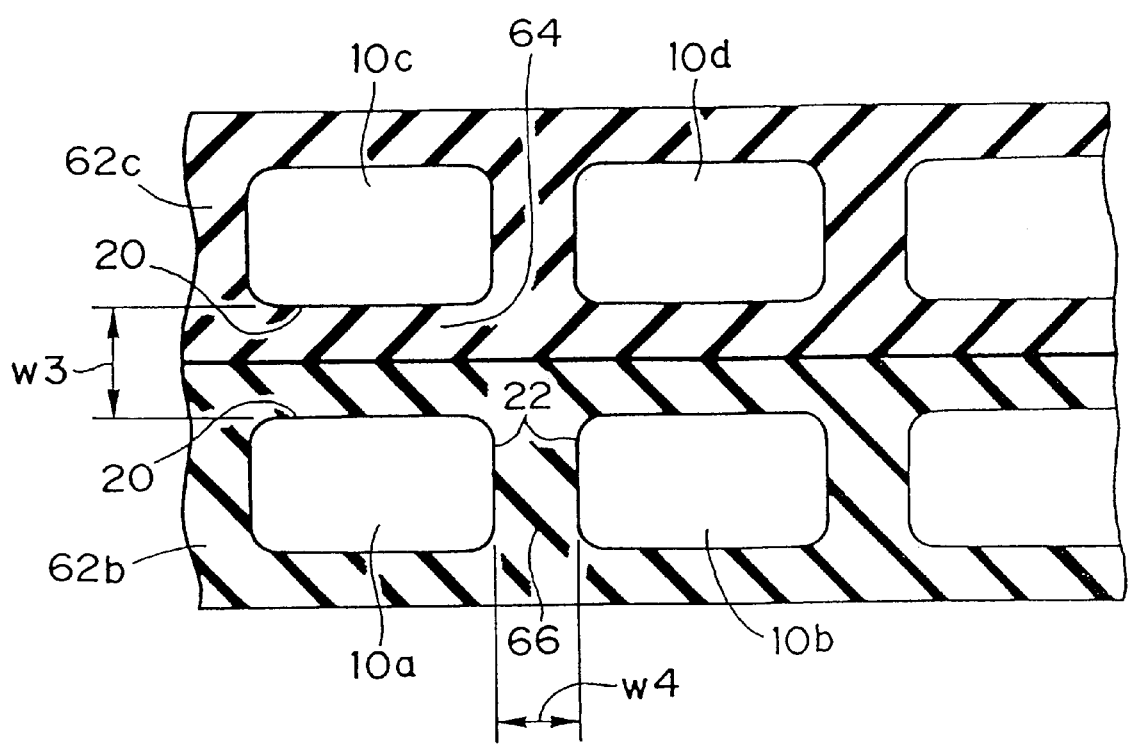
FIG. 11 is a cross sectional view which shows a state in which steel cords are disposed in a belt layer.

In the tire 56 thus prepared, operation of shear stress between the reinforcement plies 62b and 62c will be described hereinafter with reference to FIG. 11.

The steel cords 10a and 10b in the reinforcement ply 62b are disposed so that respective second flat side surface portions 22 thereof are made parallel to each other. The steel cords 10c and 10d in the reinforcement ply 62c are also disposed in such a manner as described above. Since the reinforcement plies 62b and 62c are laminated, the steel cord 10a of the reinforcement ply 62b and the steel cord 10c of the reinforcement ply 62c are disposed with respective first flat side surface portions 20 thereof facing each other. Accordingly, a thickness w3 of layer-to-layer rubber 64 between the steel cords 10a and 10c becomes substantially uniform and the distribution of shear stress acting on the layer-to-layer rubber 64 becomes almost fixed. As a result, the tensile rigidity of the belt layer 62 increases.

In one reinforcement ply 62b as well, a thickness w4 of rubber 66 between the adjacent steel cords 10a and 10b becomes substantially uniform, and therefore, the distribution of shear stress acting on the rubber 66 also becomes uniform. Accordingly, the tensile rigidity of the belt layer 62 is further increased.

Next, the effects of the tire 56 according to the present embodiment will be described based on test results.

Tires used for the test are the tires 56 of the present embodiment and tires of comparative example. The tires of comparative example are those in which conventional steel cords are used in place of the steel cords of the present embodiment in the tires used in the present embodiment, and other components are common to those of the tire 56 of the present embodiment. A conventional steel cord 70 used in the tire of comparative example is, as illustrated in FIG. 12, comprised of a core 74 in which two steel filaments 72 are disposed parallel on one plane in a cord axial direction, and an outer layer sheath 78 in which eight steel filaments 76 are twisted around the core 74 at a pitch of 16 mm substantially in close contact with the core 74. The steel cord 70 has no flat side surface portion and has a substantially elliptical cross section.

The steel filaments 72 forming the core 74 are each a brass-plated high carbon steel wire whose diameter is 0.32 mm and tensile strength is 3000 N/mm$^2$. The steel filaments 76 forming the outer layer sheath 78 are each a brass-plated high carbon steel wire whose diameter is 0.30 mm and tensile strength is 3040 N/mm$^2$.

Respective test results of the tires of present embodiment and of the tires of comparative example are shown in Table 1 with an index number of comparative example set as 100. Larger the value of an index number, more excellent the results. Test conditions and evaluation methods are described below.

(1) Tensile Rigidity of a Belt

A sample of a portion of the belt layer 62 in which the reinforcement plies 62b and 62c are laminated was cut out from the tire and was pulled by using a tension testing machine in a direction corresponding to a tire circumferential direction at a speed of 10 mm/min, and the relation between tensile load and an amount of extension of the sample was obtained.

(2) Cornering Force

Each tire was fitted with a normal rim, an internal pressure of each tire was set at 7.0 kg/cm$^2$, and a cornering force at a load of 2400 kg, a speed of 50 km/h, and a slip angle of ±2 degrees was measured.

(3) Rolling Resistance

Tires each having an internal pressure of 7.0 kg/cm$^2$ were placed in a drum tester and preliminarily driven for 30 minutes at 80 km/h, and thereafter, the internal pressure thereof was readjusted and the speed was increased to 150 km/h. Thereafter, the tires were coasted, and a time required for the vehicle to decrease its speed from 140 km/h to 20 km/h was measured, which was set as an index number of rolling resistance.

(4) Wear Resistance

Tires were placed in an actual vehicle and the vehicle was driven until it reached a state in which the tires were almost completely worn, and a travel distance per 1 mm of amount of abrasion was measured as an index number of wear resistance.

(5) Belt-edge Separation Resistance

The tires whose internal pressures had each been adjusted to a predetermined value were placed in a drum tester, and were driven for 12 hours while intermittently imparting a slip angle of 3.5 degrees, and a length of crack formed in a belt edge was measured and compared with others.

As shown in Table 1, in the tire 56 of the present embodiment, the tensile rigidity of the belt layer 62 is high and all of the performances is excellent as compared with the tire of comparative example. In a case in which simply a tensile rigidity equivalent to that of a belt layer of comparative example is aimed at, steel filaments each having a smaller diameter can be used and the weight of a tire can thereby be reduced. Further, since the flat side surface portions 20 are provided in the steel cord 10, shear stress generated in the layer-to-layer rubber 64 of the belt layer 62 is distributed more uniformly. Accordingly, the belt-edge separation resistance observed in the present embodiment is also excellent as compared with comparative example, thereby resulting in higher durability.

TABLE 1

|  | Tensile rigidity of belt | Cornering force | Rolling resistance | Wear resistance | Belt-edge separation resistance |
|---|---|---|---|---|---|
| Comparative example | 100 | 100 | 100 | 100 | 100 |
| Example | 120 | 108 | 110 | 110 | 120 |

As described above, the steel cord of the present invention has a high tensile rigidity, and further, when it is used as a reinforcing material for a belt layer having at least two layers of reinforcement plies laminated, the shear stress of a layer-to-layer rubber is uniformly distributed, thereby making it possible to improve the tensile rigidity of the belt layer per amount of the steel cord used.

Further, the method of manufacturing the steel cord according to the present invention makes it possible to reliably manufacture the steel cord which satisfies requirements for achievement of the above-described effects.

Moreover, the radial tire of the present invention includes a belt layer in which the steel cord of the present invention is used as a reinforcing material so that the tensile rigidity thereof is high per weight of the steel cord used. Therefore, reduction in the weight of the tire, improvement in controlling stability, and reduction in fuel consumption caused by a lower rolling resistance can be realized.

INDUSTRIAL APPLICABILITY

As described above, the steel cord according to a first aspect of the present invention is suitably used in a pneumatic radial tire which aims at reduction of the weight thereof and improvement in fuel consumption without deteriorating controlling stability and durability.

In the method of manufacturing a steel cord according to a second aspect of the present invention, a steel cord suitable for a pneumatic radial tire which aims at reduction in the weight thereof and improvement in fuel consumption without deteriorating controlling stability and durability can be manufactured.

A pneumatic radial tire according to a third aspect of the present invention is suitably used for vehicles which requires improvement in fuel consumption, for example, a truck and a bus.

What is claimed is:

1. A steel cord comprising:
   a core formed by at least one straight filament; and
   an outer layer sheath including plural filaments, each filament having a diameter, all the diameters being substantially equal and said plural filaments being twisted around the core at substantially the same pitches,
   wherein said steel cord has a flat side surface portion on which at least two of said plural filaments forming the outer layer sheath are substantially arranged.

2. A steel cord according to claim 1, comprising a pair of the flat side surface portions facing in parallel with each other with the core located therebetween as the center.

3. A steel cord according to claim 2, comprising two pairs of the flat side surface portions each facing in parallel with each other with the core located therebetween as the center, wherein an angle formed by the flat side surface portion of a first pair and the flat side surface portion of a second pair is substantially a right angle.

4. A steel cord according to claim 1, wherein a width of each of the flat side surface portions is one fourth or more of a cord width parallel to the flat side surface portion.

5. A steel cord according to claim 1, wherein a width of each of the flat side surface portions is a half or more of a cord width parallel to the flat side surface portion.

6. A steel cord according to claim 1, wherein, among the filaments each arranged on at least one of the flat side surface portions, a maximum width of a clearance between adjacent filaments is equal to or less than the diameter of each filament.

7. A steel cord according to claim 1, wherein, among the filaments each arranged on at least one of the flat sided surface portions, adjacent filaments are disposed substantially in close contact with each other.

8. A steel cord according to claim 1, wherein the core is formed in such a manner that plural filaments or strands are disposed on a plane in close contact with one another, and flat side surface portions are provided substantially parallel to the plane, and
   a cord width a in a direction parallel to the plane on which the filaments for forming the core are disposed, and a cord width b in a direction perpendicular to the cord width a are given so as to satisfy the following expressions.

$$1.00 \leq a/(Xc+2 \times ds) \leq 1.03 \quad (1)$$

$$1.00 \leq b/(Yc+2 \times ds) \leq 1.03 \quad (2)$$

wherein, Xc is a large width of the core; Yc is a small width of the core; and ds is a diameter of each of the filaments forming the outer layer sheath.

9. A steel cord comprising:
   a core formed by at least one filament; and
   an outer layer sheath including plural filaments, each filament having a diameter, all the diameters being substantially equal and said plural filaments being twisted around the core at substantially the same pitches,
   said steel cord having a flat side surface portion on which at least two of said plural filaments forming the outer layer sheath are substantially arranged,
   two pairs of the flat side surface portions each facing in parallel with each other with the core located therebetween as the center, wherein an angle formed by the flat side surface portion of a first pair and the flat side surface portion of a second pair is substantially a right angle.

10. A steel cord comprising:

a core formed by at least one filament; and an outer layer sheath including plural filaments, each filament having a diameter, all the diameters being substantially equal and said plural filaments being twisted around the core at substantially the same pitches, wherein said steel cord has a flat side surface portion on which at least two of said plural filaments forming the outer layer sheath are substantially arranged, and among the filaments each arranged on the flat side surface portion, adjacent filaments are disposed substantially in close contact with each other.

11. A steel cord comprising:

a core formed by plural filaments disposed on a plane in close contact with one another; and an outer layer sheath including plural filaments, each filament having a diameter, all the diameters being substantially equal and said plural filaments forming the outer layer sheath being twisted around the core at substantially the same pitches, wherein said steel cord has a flat side surface portion on which at least two of said plural filaments forming the outer layer sheath are substantially arranged, a pair of the flat side surface portions being provided substantially parallel to the plane on which the filaments forming the core are disposed, and a cord width a in a direction parallel to the plane on which the filaments forming the core are disposed, and a cord width b in a direction perpendicular to the cord width a are given so as to satisfy the expressions $$1.00 \leq a(Xc+2 \times ds) \leq 1.03$$

$$1.00 \leq b(Yc+2 \times ds) \leq 1.03$$

wherein, Xc is a large width of the core; Yc is a small width of the core; and ds is a diameter of each of the filaments forming the outer layer sheath.

12. A method of manufacturing a steel cord, the steel cord comprising a core formed by at least one straight filament and an outer layer sheath including plural filaments, each filament having a diameter, all the diameters being substantially equal, said plural filaments being twisted around the core at substantially the same pitches, said steel cord having a flat side surface portion on which at least two of said plural filaments forming the outer layer sheath are substantially arranged, the method comprising the steps of:

forming at least two bending portions in each of the filaments forming the outer layer sheath per filament length equal to one twist pitch, with the filament length equal to one twist pitch being a cycle;

collecting and twisting the filaments so that bending portions belonging to the same phase are arranged substantially in one row along a cord axial direction on a side surface of the cord; and compressing side surfaces of the cord.

13. A radial tire comprising:

a pair of bead portions;

a carcass extending between said bead portions in a toroidal shape; and a belt layer comprised of at least two layers of reinforcement plies in which steel cords are embedded parallel on a crown portion of said carcass, wherein said steel cords each comprise a core formed by at least one straight filament; and an outer layer sheath including plural filaments, each filament having a diameter, all the diameters being substantially equal and said plural filaments being twisted around the core and substantially the same pitches, wherein said steel cords have a flat side surface portion on which at least two of said plural filaments forming the outer layer sheath are substantially arranged, and respective flat side surface portions of steel cords of adjacent reinforcement plies are disposed to face in parallel with each other.

* * * * *

UNITED STATES PATENT AND TRADEMARK OFFICE
CERTIFICATE OF CORRECTION

PATENT NO.    : 6,425,428 B1
DATED         : July 30, 2002
INVENTOR(S)   : Shuichi Onuma Naohiko Obana and Noboru Kusaba It is certified that error appears in the above-identified patent and that said Letters Patent is hereby corrected as shown below:

<u>Title page,</u>
Item [56], FOREIGN PATENT DOCUMENTS, please insert the following cited references:
-- EP 0 264 071      04/1998*
EP 0 264 145      04/1988* --

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,425,428 B1  
DATED         : July 30, 2002  
INVENTOR(S)   : Shuichi Onuma, Naohiko Obana and Noboru Kusaba It is certified that error appears in the above-identified patent and that said Letters Patent is hereby corrected as shown below:

<u>Title page,</u>
Item [56], FOREIGN PATENT DOCUMENTS, please insert the following cited references:
-- EP 0 264 071         04/1988*
EP 0 264 145            04/1988* --

This certificate supersedes Certificate of Correction issued January 21, 2003.

Signed and Sealed this

Twenty-first Day of January, 2003

JAMES E. ROGAN
*Director of the United States Patent and Trademark Office*